(12) United States Patent
Sproatt et al.

(10) Patent No.: US 6,948,722 B2
(45) Date of Patent: Sep. 27, 2005

(54) APPARATUS AND METHOD FOR AUTOMATICALLY LEVELING AN OBJECT

(75) Inventors: James Sproatt, Elkhart, IN (US); Alice Posley, Elkhart, IN (US); Michael Seiy, Ft. Wayne, IN (US); Mark M. Eichhorn, Mishawaka, IN (US)

(73) Assignee: Days Corporation, Elkhart, IN (US)

( * ) Notice: Subject to any disclaimer, the term of this patent is extended or adjusted under 35 U.S.C. 154(b) by 0 days.

(21) Appl. No.: 10/659,990

(22) Filed: Sep. 11, 2003

(65) Prior Publication Data

US 2004/0046337 A1 Mar. 11, 2004

Related U.S. Application Data

(63) Continuation of application No. 09/522,545, filed on Mar. 10, 2000, now Pat. No. 6,619,693.

(51) Int. Cl.[7] .................................................. B60S 9/00
(52) U.S. Cl. .................................. 280/6.153; 280/6.156
(58) Field of Search ........................... 280/6.153, 6.154, 280/6.155, 763.1, 764.1, 766.1; 180/41; 254/423

(56) References Cited

U.S. PATENT DOCUMENTS

| | | |
|---|---|---|
| 3,857,582 A | 12/1974 | Hartog |
| 4,061,309 A | 12/1977 | Hanser |
| 4,103,869 A | 8/1978 | Mesny et al. |
| 4,142,710 A | 3/1979 | Okuda |
| 4,165,861 A | 8/1979 | Hanser |
| 4,597,584 A | 7/1986 | Hanser |
| 4,743,037 A | 5/1988 | Hanser |
| 4,746,133 A | 5/1988 | Hanser et al. |
| 4,815,757 A | 3/1989 | Hamilton |
| 4,913,458 A | 4/1990 | Hamilton |
| 5,143,386 A * | 9/1992 | Uriarte ........................ 254/418 |
| 5,188,379 A | 2/1993 | Krause et al. |
| 5,237,782 A | 8/1993 | Cooper |
| 5,312,119 A | 5/1994 | Schneider et al. |
| 5,580,095 A | 12/1996 | Fukumoto |
| 5,676,385 A * | 10/1997 | Schneider et al. ....... 280/6.153 |
| 5,833,296 A | 11/1998 | Schneider |
| 5,913,525 A * | 6/1999 | Schneider et al. ....... 280/6.153 |
| 6,050,573 A | 4/2000 | Kunz |

OTHER PUBLICATIONS

Advertisement: "Straight Truck Hydraulic Lift Systems" by Equalizer Systems.
Advertisement; "Hydraulic Lift Systems Single Leg AM Series Systems for Fifth Wheel, Gooseneck and Towable Trailers" by Equalizer Systems.
Advertisement; "Equalizer El–Pac Power Lifting System" by Equalizer System.
Advertisement; "Single and Dual Leg CM Series Systems for Fifth Wheel, Gooseneck and Low Boy Trailers" by Equalizer Systems.

* cited by examiner

*Primary Examiner*—David R. Dunn
(74) *Attorney, Agent, or Firm*—Barnes & Thornburg LLP

(57) ABSTRACT

An apparatus for automatically leveling a vehicle is provided. Having a plurality of legs, a sensor and a controller. The sensor is mounted to the vehicle to sense pitch and roll of the vehicle relative to a reference level plane. The sensor produces an orientation signal representing the vehicle pitch and roll. The controller is coupled to each of the legs and to the sensor, and monitors the orientation signal received from the sensor and in response to that signal the controller causes at least one of the legs to retract to move the vehicle downwardly relative to the ground surface, for orienting the vehicle with the reference level plane within a tolerance.

19 Claims, 8 Drawing Sheets

APPARATUS AND METHOD FOR AUTOMATICALLY LEVELING AN OBJECT

RELATED APPLICATIONS

The present application is a Continuation of U.S. patent application Ser. No. 09/522,545, filed on Mar. 10, 2000 now U.S. Pat. No. 6,619,693, entitled *Apparatus and Method for Automatically Leveling an Object*. To the extent not included below, the subject matter disclosed in those applications is hereby expressly incorporated into the present application.

TECHNICAL FIELD

The present invention relates to an apparatus and method for automatically leveling a vehicle, such as a recreational vehicle, or a platform, such as an industrial platform, when the vehicle or platform is stationary and located on uneven terrain or an out-of-level surface. Specifically, the present invention relates to a microprocessor-based controller apparatus connected to four extendible legs mounted to the vehicle or platform, the controller interpreting an orientation signal corresponding to the vehicle or platform pitch and roll from a level sensor mounted on the vehicle or platform, to extend and retract the legs according to a predetermined method, thereby leveling the vehicle or platform.

BACKGROUND AND SUMMARY

Vehicles, such as recreational vehicles, are often parked at campsites or other locations on uneven terrain. Consequently, the comfort of the occupants of the vehicle while eating, sleeping, etc. Within the vehicle, as well as the proper operation of some appliances such as refrigeration devices, may be adversely affected by the out-of-level orientation of the vehicle. Similarly, certain industrial devices require a level orientation for proper operation and are therefore mounted on platforms which may be leveled according to the teachings of the present invention. For simplicity, the remainder of this specification will describe the invention as used to level a vehicle although the apparatus and method described herein may have other applications.

It is known to employ jacks, blocks, or even hydraulically driven extendible legs mounted to a vehicle, to raise the low portions of the vehicle in an attempt to level a vehicle. Obviously, manual methods, such as using jacks and blocks, for leveling a vehicle the size of a recreational vehicle are undesirable. Manually leveling a vehicle may require raising one corner of the vehicle at a time, thereby inducing cross-frame stresses which may damage the vehicle frame. Additionally, manual jacks are potentially dangerous, time-consuming to use, inaccurate, and inconvenient, especially in bad weather or in cold or muddy conditions.

Manual actuation of hydraulically-driven extendible legs mounted to the vehicle frame is an improvement on the use of jacks to level a vehicle. However, even a skilled user attempting to level a vehicle by individually actuating extendible legs mounted to the vehicle may over extend a leg such that cross-frame stresses are imposed upon the vehicle. Additionally, the process of extending individual legs, manually checking the orientation of the vehicle using a level sensor, then further adjusting the orientation of the vehicle by extending another leg, is time consuming and inaccurate.

Accordingly, an illustrative embodiment of the present disclosure provides an apparatus for automatically leveling a vehicle. The apparatus comprises a right front leg, a left front leg, a right rear leg, and a left rear leg mounted to the vehicle. Each leg is independently adjustable between a stowed position and an extended position wherein the leg engages the ground. A sensor is mounted to the vehicle to sense the pitch and roll of the vehicle relative to a reference level plane. The sensor produces an orientation signal representing the vehicle pitch and roll. A controller is coupled to the legs and the sensor. The controller responds to an operator command to level the vehicle relative to the reference level plane by actuating the legs such that they move from their stowed position to their extended position. The orientation signal determines an end and a side of the vehicle which is above the reference level plane and then alternates between adjusting the end and the side downwardly by retracting the legs at the end, and retracting the legs at the side. Each leg is retracted for a first predetermined period of time during each downward adjustment.

In the above and other illustrative embodiments, the apparatus may also provide: the sensor providing the orientation signal to the controller indicating a change in the vehicle orientation after each leg engages the ground and extends sufficiently to affect the vehicle orientation; the controller interpreting the orientation signal after each adjustment to determine whether either the end or the side has passed through the reference level plane; upon determining that one end or side has passed through the reference level plane, the controller alternates between adjusting the one end or side upwardly by extending the legs at the one end or side for a second predetermined period of time which is less than the first predetermined period of time, and continuing to adjust the other end or side downwardly by sequentially retracting the legs at the other end or side for the first predetermined period of time; the controller changes the direction of adjustment of the end and the side each time the end and the side pass through the reference level plane as indicated by the orientation signal and reduces the period of time for extending or retracting the legs at the end and the side with each passing of the reference level plane; switches for individually actuating the legs; and four leg sensors mounted adjacent each of the respective legs, each leg sensor being connected to the controller to provide a signal indicating that the respective leg is in its stowed position.

Another illustrative embodiment of the present disclosure provides an apparatus for automatically leveling a vehicle. The apparatus comprises a plurality of legs, a sensor and a controller. Each of the legs is movable to a retracted stowed position to allow the vehicle to travel. Each of the legs is also movable to an extended use position to engage a ground surface prior to leveling the vehicle. The sensor is mounted to the vehicle to sense pitch and roll of the vehicle relative to a reference level plane. The sensor produces an orientation signal representing the vehicle pitch and roll. The controller is coupled to each of the legs and to the sensor, and monitors the orientation signal received from the sensor and in response to that signal the controller causes at least one of the legs to retract to move the vehicle downwardly relative to the ground surface, for orienting the vehicle with the reference level plane within a tolerance.

In the above and other illustrative embodiments, the apparatus may also provide: the sensor providing the orientation signal to the controller indicating a change in the vehicle orientation after each leg engages the ground and extends sufficiently to affect the vehicle orientation; the controller interpreting the orientation signal after each adjustment to determine whether a portion of the vehicle has passed through the reference level plane; wherein upon determining that a portion of the vehicle has passed through the reference level plane, the controller alternates between adjusting an end upwardly by extending legs for a second predetermined period of time which is less than the first predetermined period of time, and continuing to adjust another end downwardly by retracting the leg at this other end for the first predetermined period of time; upon determining that a portion of the vehicle has passed through the reference level plane, the controller alternates between adjusting an end upwardly by extending the legs at the end for a predetermined period of time, and continuing to adjust another end downwardly by retracting the legs at this other end for another predetermined period of time; switches for individually actuating the legs; and leg sensors mounted adjacent each of the respective legs, wherein each leg sensor being connected to the controller to provide a signal indicating that the respective leg is in its stowed position.

Another illustrative embodiment of the present disclosure provides an method for automatically leveling a vehicle. The vehicle comprises a plurality of legs which are each attached to the vehicle such that each of the legs is movable between retracted and extended positions, a sensor mounted to the vehicle to sense pitch and roll of the vehicle and which provides an orientation signal representing the pitch and roll, and a controller coupled to the legs and the sensor. The illustrative method comprises: extending each leg until it engages a ground surface; comparing the orientation signal produced by the sensor to the reference level plane after all legs have engaged the ground; determining a high portion of the vehicle relative to the reference level plane; retracting at least one of the legs corresponding to that high portion for a determined actuation period; and determining whether the high portion of the vehicle has moved through the reference level plane after the retraction of the at least one of the legs.

In the above and other illustrative embodiments, the method may also provide the steps of: determining a low portion of the vehicle relative to the reference level plane; extending at least on of the legs corresponding to a low portion of the vehicle for a determined actuation period; determining whether the low portion of the vehicle has moved through the reference level plane after the extension of the at least one of the legs; and changing direction of movement of the vehicle every time it passes through the reference level plane as indicated by the orientation signal, and reduces the period of time for extending or retracting the legs of the vehicle with each passing of the reference level plane.

Additional features and advantages of the apparatus and method for automatically leveling an object will become apparent to those skilled in the art upon consideration of the following detailed description of the illustrated embodiment exemplifying the best mode of carrying out the apparatus and method for automatically leveling an object as presently perceived.

BRIEF DESCRIPTION OF DRAWINGS

The foregoing and other features of the invention will become more apparent and the invention will be better understood upon consideration of the following description taken in conjunction with the accompanying drawings, wherein.

Figure 1:
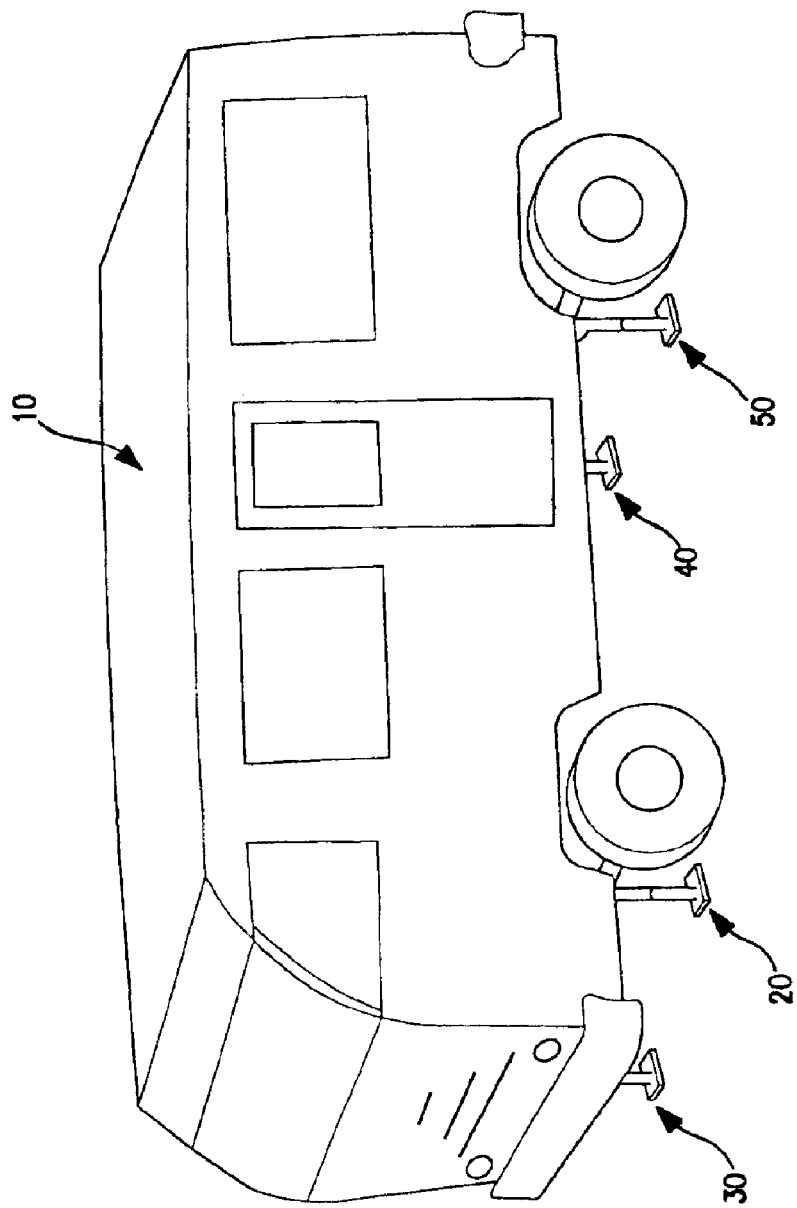
FIG. 1 is a perspective view of a vehicle with extendible legs shown attached to the frame.

Corresponding reference characters indicate corresponding parts throughout the several views. The exemplification set out herein illustrates embodiments of the apparatus and method for automatically leveling an object, and such exemplification is not to be construed as limiting the scope of the apparatus and method for automatically leveling an object in any manner.

DETAILED DESCRIPTION OF THE DRAWINGS

The embodiments described herein are not intended to be exhaustive or to limit the invention to the precise forms disclosed. Rather, the embodiments selected for description are described to permit those skilled in the art to utilize their teachings.

FIG. 1 depicts a typical recreational vehicle 10 or camper in a parked position with four adjustable legs 20, 30, 40, 50 mounted to the frame of the vehicle adjacent the four respective corners of the vehicle. Obviously, raising or lowering any one of the legs, 20, 30, 40, 50, while it is in contact with the ground, will cause a corresponding upward or downward adjustment of the corner of the vehicle 10 to which the leg is connected. While the description of the present invention provided below assumes that the legs are hydraulically actuated, as is well known in the art, the present invention is equally applicable to a system using electrically actuated legs.

Figure 2:
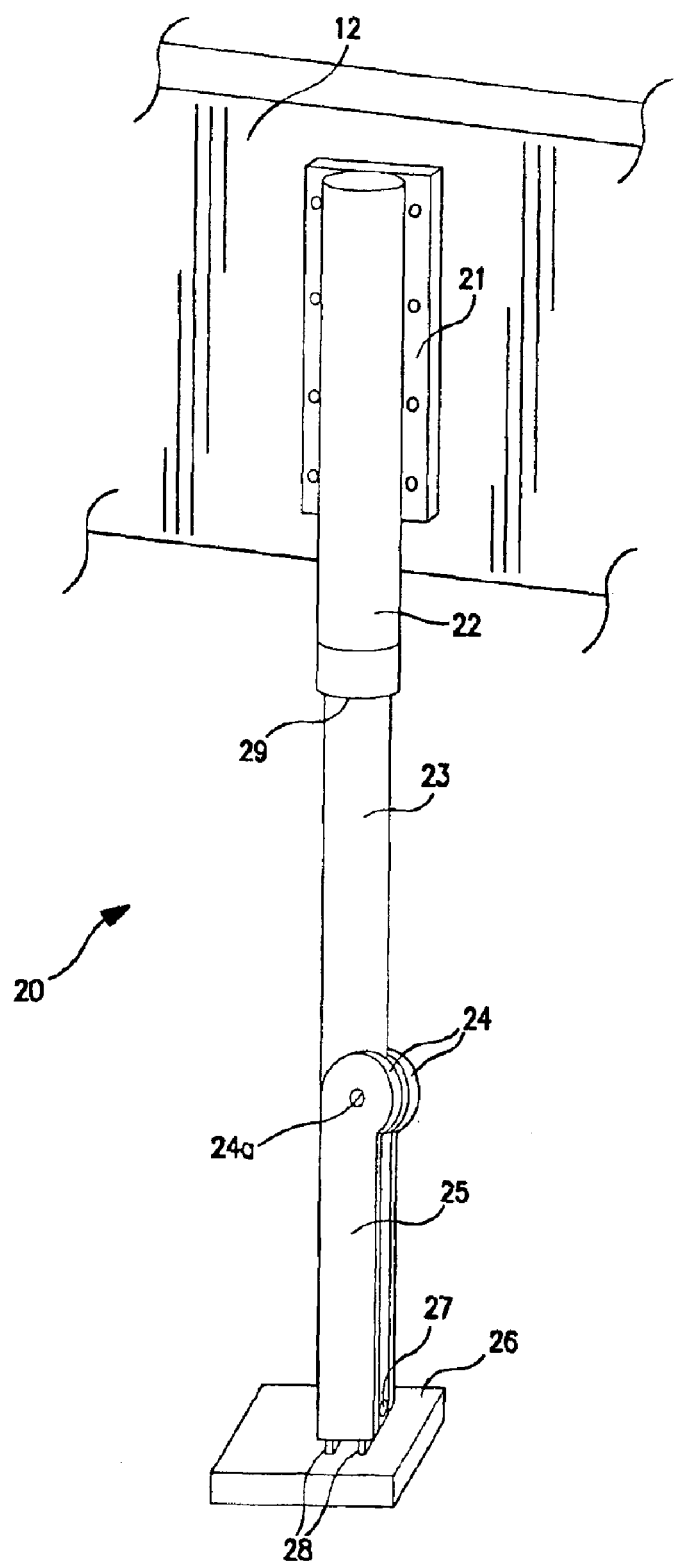
FIG. 2 is a partially fragmented perspective view of an adjustable leg shown in FIG. 1.

As best shown in FIG. 2, each leg may be bolted, welded, or otherwise fixedly secured to a portion of the vehicle frame 12. It should be noted that extendible legs of any configuration, such as axially extending telescopic legs, may be employed by the present invention. The legs described below are merely provided as an example of such extendible legs. Since all legs 20, 30, 40, 50 are identical, only one will be described herein.

Each leg 20 includes a mounting flange 21, an upper cylinder 22, a piston 23 which is movable within upper cylinder 22, a pair of cams 24, a lower extension 25, and a foot 26. As shown, foot 26 is pivotally attached to lower extension 25 by a pivot pin 27 which extends through a pair of brackets 28 extending from foot 26.

Figure 3:
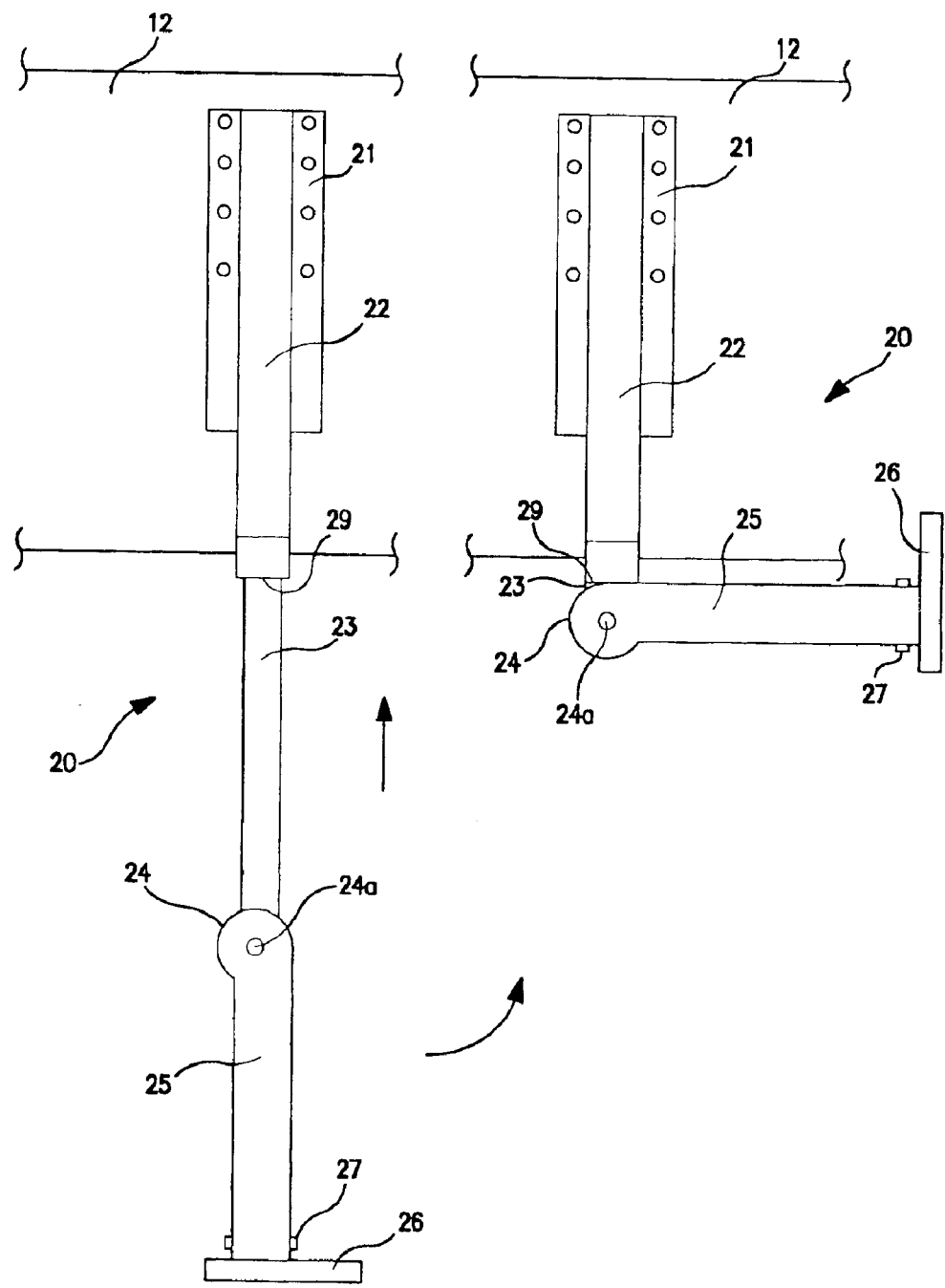
FIG. 3 is a side elevational view of an adjustable leg shown in an extended position, and a stowed position.

Referring now to FIG. 3, leg 20 is shown in an extended position, and in a retracted or stowed position. When leg 20 is retracted, piston 23 moves upwardly within upper cylinder 22 until cams 24 engage the lower edge 29 of upper cylinder 22. When this occurs, the shape of cams 24 causes lower leg extension 25 and foot 26 to pivot upwardly about a pivot pin 24a connecting cams 24 to piston 23 as the piston is further retracted within upper cylinder 22. When leg 20 is in the stowed position, increased clearance is provided under vehicle 10. When leg 20 is extended, piston 23 is moved downwardly, by hydraulic pressure or electrically, and the weight of lower leg extension 25 and foot 26 causes the lower leg extension and foot to pivot downwardly as cams 24 disengage lower edge 29 of upper cylinder 22. Further extension of piston 23 causes lower leg extension 25 and foot 26 to move downwardly and engage the ground. Finally, further extension of the piston moves vehicle 10 upwardly.

Figure 4:
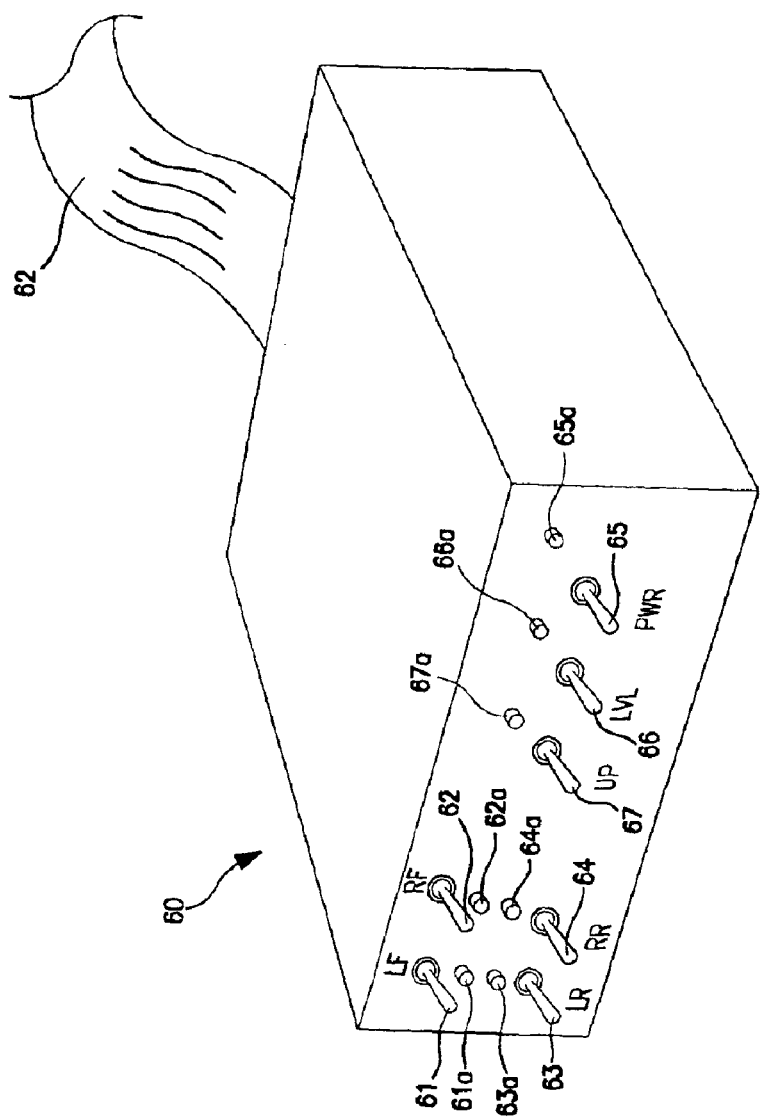
FIG. 4 is a partially fragmented perspective view of a control box according to the present invention.

Referring now to FIG. 4, the system according to the present invention includes a control box 60 which is mounted or located within vehicle 10 for easy access by the occupant. Control box 60 is electrically connected through cabling 62 to hydraulic solenoids 70 which control the individual upward and downward movement of legs 20, 30, 40, 50 in a manner known to those skilled in the art. Control box 60 is also electrically connected to leg sensors 80 mounted adjacent each leg 20, 30, 40, 50 which indicate whether the particular leg is in the stowed position.

A variety of leg sensors 80 may be used and mounted in a variety of locations. For example, a magnetic switch or contact switch (not shown) may be mounted to vehicle frame 12 such that when lower leg extension 25 is in the stowed position (FIG. 3) the lower leg extension or foot 26 contacts or is in close proximity to the switch, thereby producing a signal indicating that leg 20 is in the stowed position. Finally, control box 60 is electrically connected to the system level sensor 90 which may be mounted at any location on the vehicle.

As shown in FIG. 4, control box 60 includes a plurality of front panel switches and indicator lamps. Manual leg actuation switches 61, 62, 63, 64 are provided in the event the operator wishes to manually adjust the orientation of vehicle 10. When a leg sensor 80 detects that a leg 20, 30, 40, 50 is not in its stowed position. For example, because a manual actuation switch 61, 62, 63, 64 has been actuated (upwardly or downwardly), the appropriate manual actuation indicator lamp 61a, 62a, 63a, 64a is illuminated. System power may be turned on and off using the power switch 65. The power indicator lamp 65a provides the operator an indication that power is applied to the system.

The remaining front panel switches include the level switch 66 for commanding the system to automatically level vehicle 10, and the up switch 67 for commanding the system to retract legs 20, 30, 40, 50 in preparation for moving vehicle 10. Of course, when level switch 66 is actuated, the level indicator lamp 66a is illuminated and remains illuminated during the automatic leveling process. Similarly, when up switch 67 is actuated, the up indicator lamp 67a is illuminated and remains illuminated during the process of retracting the legs 20, 30, 40, 50. An audible warning may be sounded during any automatic movement of the legs 20, 30, 40, 50.

Figure 5:
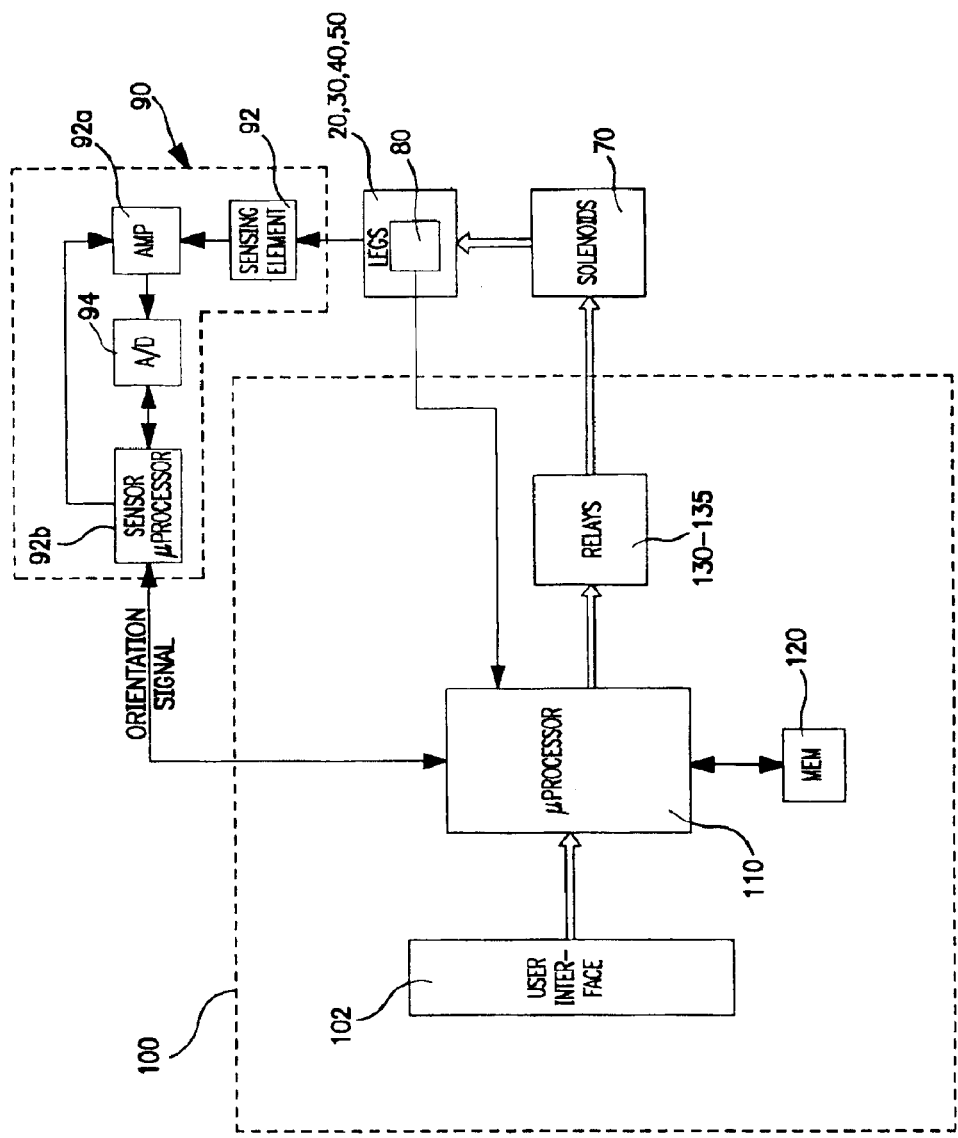
FIG. 5 is a schematic diagram of a system according to the present invention.

FIG. 5 is a schematic diagram of an automatic leveling system according to the present invention. As shown, the control box houses a controller circuit 100 including user interface 102 (switches 61–67 described above), a microprocessor 110, a memory 120, and a plurality of relays 130, 131, 132, 133, 134, 135. The operator provides input to user interface 102 (by actuating a switch, such as level switch 66) which results in a signal to microprocessor 110. The signal may be a command to raise or lower one or more of legs 20, 30, 40, 50. Accordingly, microprocessor 110 will generate an appropriate signal to actuate an appropriate relay 130–135, which in turn drives solenoids 70 which control movement of legs 20, 30, 40, 50. Controller circuit memory 120 includes data representing a reference level plane. Microprocessor 110 uses this data during the automatic leveling process, as will be described in greater detail below.

Again referring to FIG. 5, each of legs 20, 30, 40, 50 includes leg sensor 80 which provides a signal to microprocessor 110 indicating whether the leg is in the stowed position, as described above. Obviously, adjustment of any of the legs, assuming the leg is in contact with the ground, results in adjustment of the orientation of vehicle 10. Accordingly, level sensor 90, which is fixedly mounted to vehicle 10, will likewise experience a change in position. This relationship between legs 20, 30, 40, 50 and level sensor 90 is indicated by the dashed arrow shown in FIG. 5. Level sensor 90 continuously reports an orientation signal representing the orientation (pitch and roll) of vehicle 10 to a sensor controller 92b where it is maintained and reported upon request by microprocessor 110.

Level sensor 90 may be any type of dual axis sensing element 92 which provides a signal indicating whether vehicle 10 is level along its longitudinal axis (pitch, front to back) and a signal indicating whether vehicle 10 is level along its lateral axis (side to side). In one embodiment of the invention, a dual axis tilt/inclinometer sensing element 92 is used such as Part No. AU6006-A-010, manufactured by Spectron Glass & Electronics, Inc. of Hauppaugue, N.Y. This sensing element 92 provides analog signals based on the pitch position of conductive fluid (representing the pitch of the vehicle) and the roll position of the conductive fluid (representing the roll of the vehicle).

As shown in FIG. 5, the analog signals are amplified and conditioned by amplifier 92a, routed through an analog to digital convertor 94 and outputted in digital form to sensor controller 92b where the signals are maintained for delivery as the orientation signal to controller circuit 100. The sensor microcontroller 92b may also be commanded to alter the gain and offset values of amplifier 92a to achieve a suitable signal representation of the vehicle pitch and roll.

Figure 6:
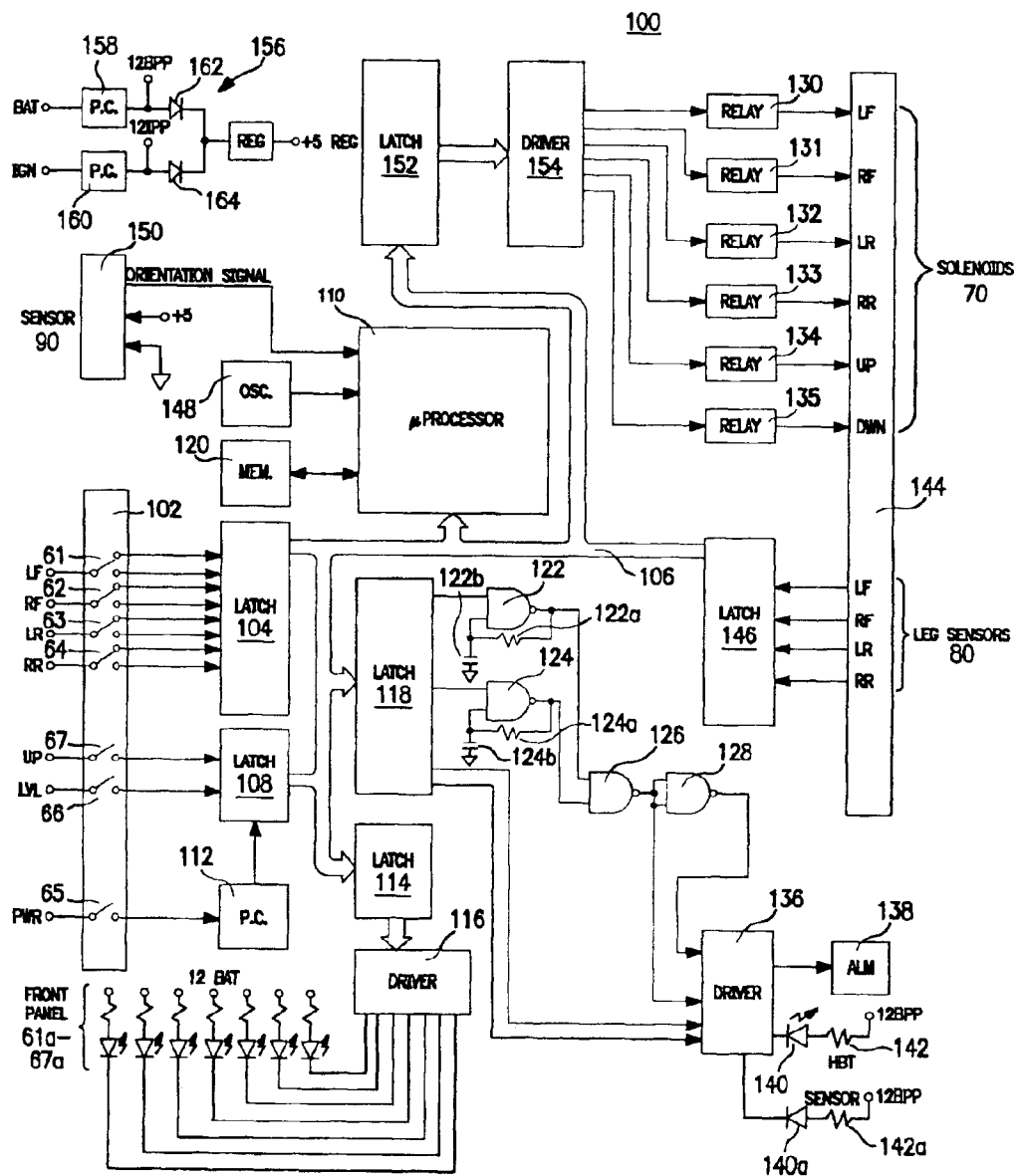
FIG. 6 is another schematic diagram of a system according to the present invention.

Referring now to FIG. 6, controller circuit 100 of FIG. 5 is more fully illustrated. Front panel switches 61–67 are shown as included within user interface 102. Manual adjustment switches 61–64 are connected to a latch 104 which outputs data to microprocessor 110 over data bus 106. Each manual switch can provide an up signal and a down signal. Up switch 67 and level switch 66 are similarly connected to a latch 108 which outputs to data bus 106. Power switch 65 causes battery power to be passed through a power conditioning circuit 112 which results in a signal to latch 108 and an output to microprocessor 110 via data bus 106. Power from switch 65 may be safety interlocked with relays 130–135 such that the relays cannot operate in the absence of power according to practices well known by those skilled in the art. Microprocessor 110 is connected through data bus 106 to another latch 114 which is connected to a driver 116 for illuminating front panel indicators 61a–67a corresponding to front panel switches 61–67.

Microprocessor 110 is also connected through data bus 106 to another latch 118 which is connected to a pair of NAND gates 122, 124, each configured with a resistor 122a, 124a and a capacitor 122b, 124b of values to generate an output signal which pulses at a particular frequency in a manner known to those skilled in the art. The frequency of the output of NAND gate 122 is different from the frequency of the output of NAND gate 124. The output signals of NAND gates 122, 114 are routed to another pair of NAND gates 126, 128 and through a driver 136 to an alarm circuit 138, the operation of which will be further described below.

Latch 118 also has a pair of outputs which are routed through driver 136. One of these outputs operates a heartbeat LED 140 and resistor 142 circuit which continuously flashes to indicate that microprocessor 110 of controller circuit 100 is operational. The other output operates a sensor LED 140a and resistor 142*a* circuit which is turned on when valid communications have been established between microprocessor 110 and sensor microprocessor 92*b* indicating that the sensor 90 and its wiring are operational.

Again, referring to FIG. 6, sensor signals from leg sensors 80 are routed through a connector 144 to a latch 146. The output of latch 146 is connected to microprocessor 110 via data bus 106. As indicated above, the state of each of the leg sensor signals indicates whether the corresponding leg 20, 30, 40, 50 is in the stowed or extended position.

Microprocessor 110 is connected to data bus 106, memory 120, an oscillator 148, and a connector 150 which is routed to level sensor 90. Oscillator 120 is of a configuration commonly known by those skilled in the art. Memory 120 may be a variety of different components and circuits which provide nonvolatile memory storage. In fact, memory 120 may be a part of microprocessor 110. Microprocessor 110 is connected to latch 152 via data bus 106 which provides outputs to a driver 154 which is capable of driving relays 130–135. Relays 130–133 are routed through connector 144 and individually connected to solenoids 70 which drive legs 20, 30, 40, 50. The two remaining relays 134, 135 are connected to solenoids which control the direction of actuation of legs 20, 30, 40, 50.

The power distribution circuit 156 includes power conditioning circuits 158, 160 which receive 12 volt power from the vehicle battery (12 BAT) and 12 volt power from the vehicle ignition system (12 IGN). Conditioned battery power (12 BPP) is distributed to various locations in controller circuit 100. Likewise, conditioned ignition power (12 IPP) is distributed to various locations in controller circuit 100 as well as providing an input (not shown) to microprocessor 110 which may be used to interlock the system such that no leg may be extended when the vehicle 10 may be in motion. The signal is also interlocked with signals from leg sensors 80 to cause an alarm if the vehicle 10 is about to move with any leg 20, 30, 40, 50 in an unstowed position. Both 12 volt power lines are passed through diodes 162, 164 into a regulator circuit 166 which regulates either 12 volt signal to a positive 5 volt signal for use with the logic devices of controller circuit 100.

Once power is applied to circuit, microprocessor 100 sends a continuous signal through data bus 106 to latch 118 which in turn provides a signal to driver 136 which drives heartbeat LED 140 indicating that power is applied and microprocessor 110 is working. If an operator wishes to raise the left front corner of vehicle 10, for example, the operator may move manual adjustment switch 61 into the down (extend) position which provides a signal to latch 104. Latch 104 outputs a signal to microprocessor 110 via data bus 106. Microprocessor 110 interprets the signal as a command to further extend left front leg 20. Microprocessor 110 generates an output signal which passes to latch 152 via data bus 106 to driver 154, and results in actuating up relay 134 and left front relay 130. These relays pass signals through connector 144 to solenoids 70 (FIG. 6) which actuate left front leg 20, causing it to extend so long as the signals are present. Any of the remaining legs 30, 40, 50 may be manually adjusted in this manner.

Whenever a leg 20, 30, 40, 50 is extended from its stowed position, its respective leg sensor 80 sends a signal to latch 146. Latch 146 signals microprocessor 110 via data bus 106. Microprocessor 110 interprets these signals, and in turn sends signals to latch 114 via data bus 106 to activate the corresponding LED 61*a*–67*a*. The signal may be intermittent to indicate a fault such as failure of a leg to leave the stowed position.

If the operator actuates level switch 66, the automatic leveling process begins. Level switch 66 generates a signal which is passed through latch 108 to microprocessor 110 via data bus 106. Microprocessor 110 interprets the signal as a command to automatically level vehicle 10. Microprocessor 110 verifies that vehicle 10 ignition power is absent, that there is sufficient vehicle power, that a valid reference level plane has been stored in memory 120, and that valid communication with an operational level sensor 90 exists. If any faults are present, microprocessor 110 denies the operator request with a signal via data bus 106 through latch 118, NAND gates 122–128, and driver 136 to alarm 138. Microprocessor 110 also provides a visual indication of a fault condition via data bus 106 through latch 114 and driver 116 to LED 66*a*. Microprocessor 110 reads the latched leg sensor 80 signals to verify that all legs 20, 30, 40, 50 are presently in their stowed position. All legs will typically be in the stowed position because level switch 66 is generally the first switch actuated after parking vehicle 10 at a desired location. If any leg 20, 30, 40, 50 is not in the stowed position, microprocessor 110 actuates that leg in the up direction until microprocessor 110 receives a leg sensor 80 signal indicating that the leg has been moved into the stowed position.

After the stowed position of the legs has been confirmed, microprocessor 110 actuates one of the legs, for example, left front leg 20, (through latch 152, driver 154, relay 130, connector 144, and solenoid 70, as described above) for a predetermined period (in one embodiment, approximately 1.5 seconds) to lower piston 23 of the leg 20 such that leg cams 24 disengage from lower edge 29 of upper cylinder 22 and lower leg extension 25 and foot 26 swing downwardly into alignment with upper cylinder 22. Immediately after actuating a leg in this manner, microprocessor 110 counts a predetermined period of time without executing further commands while the leg stops swinging.

Microprocessor 110 then monitors the orientation signal received from level sensor 90 as microprocessor 110 further actuates one of the legs, for example, left front leg 20, extending it downwardly until it engages the ground. When leg 20 engages the ground and continues to extend, it raises the left front corner of vehicle 10. When microprocessor 110 determines from the orientation signal that that corner has been raised (some fraction of a degree), microprocessor 110 stops actuating leg 20. Microprocessor 110 continues actuating the remaining legs 30, 40, 50 sequentially, and monitoring the orientation signal to determine when each leg engages the ground (that is, when level sensor 90 indicates that the orientation of vehicle 10 has changed by a small amount).

After all legs 20, 30, 40, 50 have been extended sufficiently to engage the ground, microprocessor 110 reads the orientation signal from level sensor 90 and compares it to data stored in memory 120 representing a reference level plane. As will be further described below, the reference level plane generally corresponds to a vehicle orientation which results in the interior of the vehicle feeling at true level relative to horizontal. Then, microprocessor 110 determines, based on these data, the low end of vehicle 10 and the low side of vehicle 10. Finally, microprocessor 110 begins leg adjustment as described below such that the actual vehicle orientation approaches the reference level plane.

Figure 7:
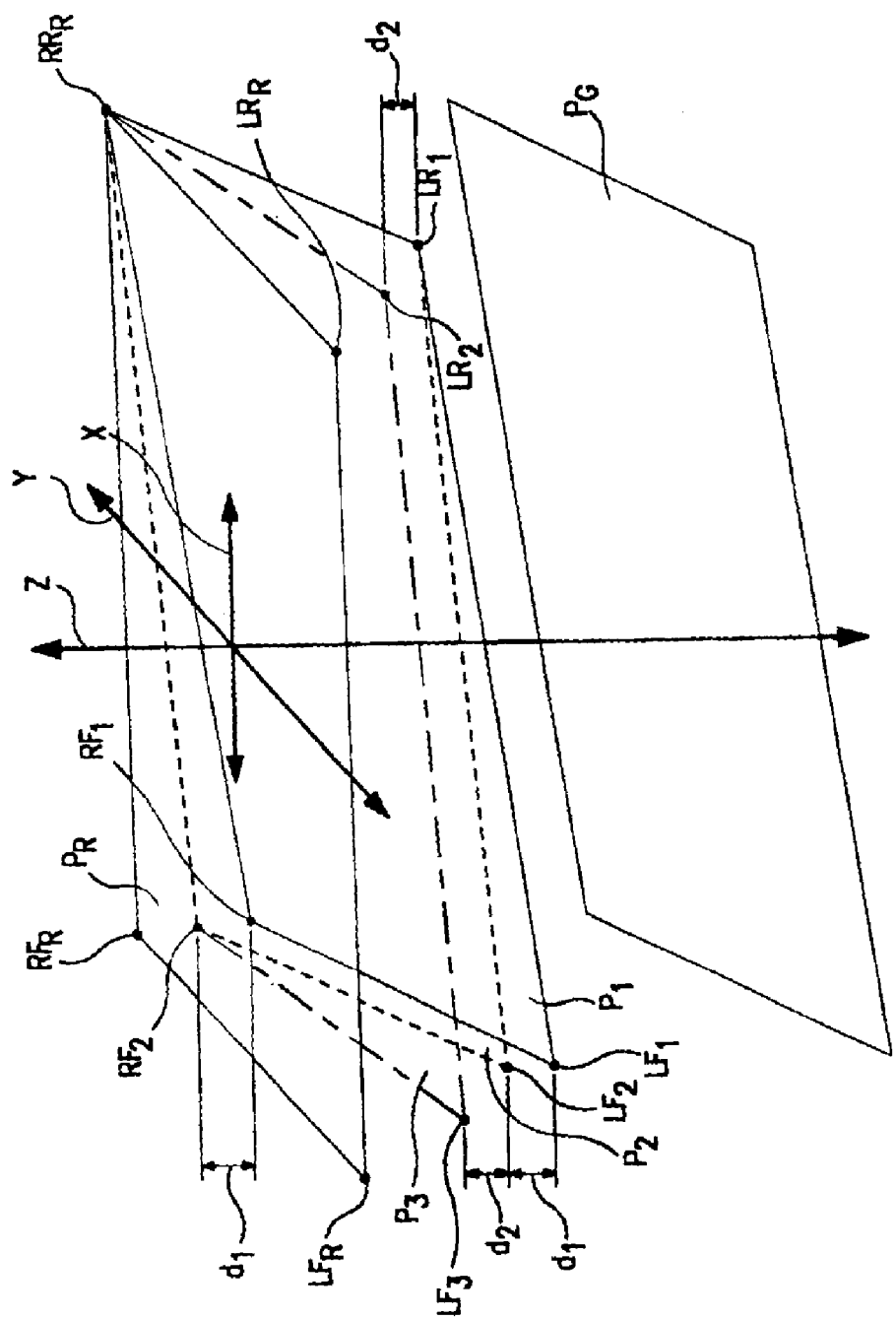
FIG. 7 is a three-dimensional diagram of various planes to illustrate the method of adjustment of the vehicle orientation according to the present invention.

Referring now to FIG. 7, plane $P_G$ represents the plane of the ground on vehicle 10 is parked. Plane $P_1$ represents the plane of the vehicle before any leveling adjustment has been performed (but after all legs have engaged the ground). It should be noted that the plane $P_1$ is approximately parallel to the plane $P_G$. Plane $P_1$ is defined by the elevation of frame 12 at the four mounting locations of each of the four legs. Thus, the plane $P_1$ of FIG. 7 is defined by the points $LF_1$ (the initial position of the left front corner of vehicle 10 when left front leg 20 first engages the ground), $RF_1$ (the initial position of the right front corner of vehicle 10 after right front leg 30 engages the ground), $RR_R$ (the initial position of the right rear corner of vehicle after right rear leg 40 has engaged the ground), and $LR_1$ (the initial position of the left rear corner of vehicle 10 after left rear leg 50 has engaged the ground).

Plane $P_R$ represents the reference level plane stored in memory 120. The plane $P_R$ is similarly defined by four points ($LF_R$, $RF_R$, $RR_R$, and $LR_R$). The reference plane $P_R$ passes through the vertical Z axis and contains the X and Y axes of the coordinate system of FIG. 7. As should be apparent from the foregoing, when vehicle 10 is in the reference level plane $P_R$, or a plane which is parallel to the plane $P_R$, vehicle 10 is preferably at true level (the pitch of vehicle 10 front to back is parallel with the X axis, and the roll of vehicle 10 side to side is parallel with the Y axis).

When microprocessor 110 compares the present orientation signal received from level sensor 90 to the data representing the reference level plane $P_R$ received from memory 120, the microprocessor 110 may determine, for example, that the front end of vehicle 10 is low and the left side of vehicle 10 is low (below a plane parallel with the reference level plane $P_R$). Accordingly, microprocessor 110 determines that the point $LF_1$ is the low corner of vehicle 10. As such, microprocessor 110 executes the auto leveling program by extending left front leg 20, in the manner described above, for a first predetermined period of time (for example, one second). The left front corner of vehicle 10 will move upwardly a distance $d_1$ to the position labeled $LF_2$. Next, right front leg 30 is actuated for the same predetermined period of time such that it travels upwardly a distance $d_1$ to the position labeled $RF_2$. In this manner, the front end of vehicle 10 experiences an upward adjustment by individual adjustments to left front leg 20 and right front leg 30.

Microprocessor 110 next causes an upward adjustment of the low side of vehicle 10 (the left side) by individually actuating left front leg 20 and left rear leg 50. First, left front leg 20 is actuated upwardly for the same predetermined period of time such that the left front corner of vehicle 10 moves from the position $LF_2$ to the position $LF_3$ (equivalent to an upward adjustment of the distance $d_2$). Finally, left rear leg 50 is actuated for the predetermined period of time such that the point $LR_1$ moves to the point $LR_2$ (corresponding to an upward adjustment of distance $d_2$).

The above-described adjustment sequence constitutes one iteration of the automatic leveling sequence. After the first iteration, the vehicle frame has passed through the plane $P_2$ (resulting from adjustment of the front end of vehicle 10) and lies in plane $P_3$ which is defined by corners $LF_3$, $RF_2$, $RR_R$, and $LR_2$. As is apparent from the figure, the plane $P_3$ represents a front end of vehicle 10 which is still below the reference level plane $P_R$, and a left side of vehicle 10 which is still below the reference level plane $P_R$. Accordingly, microprocessor 110 will continue to execute adjustment iterations, monitoring the orientation signal from level sensor 90 after each adjustment of each leg to determine the position of the leg relative to the reference level plane $P_R$. Each adjustment iteration is characterized by individual actuations of left front leg 20 and right front leg 30 followed by individual actuations of left front leg 20 and left rear leg 50. Each upward adjustment of each leg is for the predetermined period of time as described above.

Figure 8:
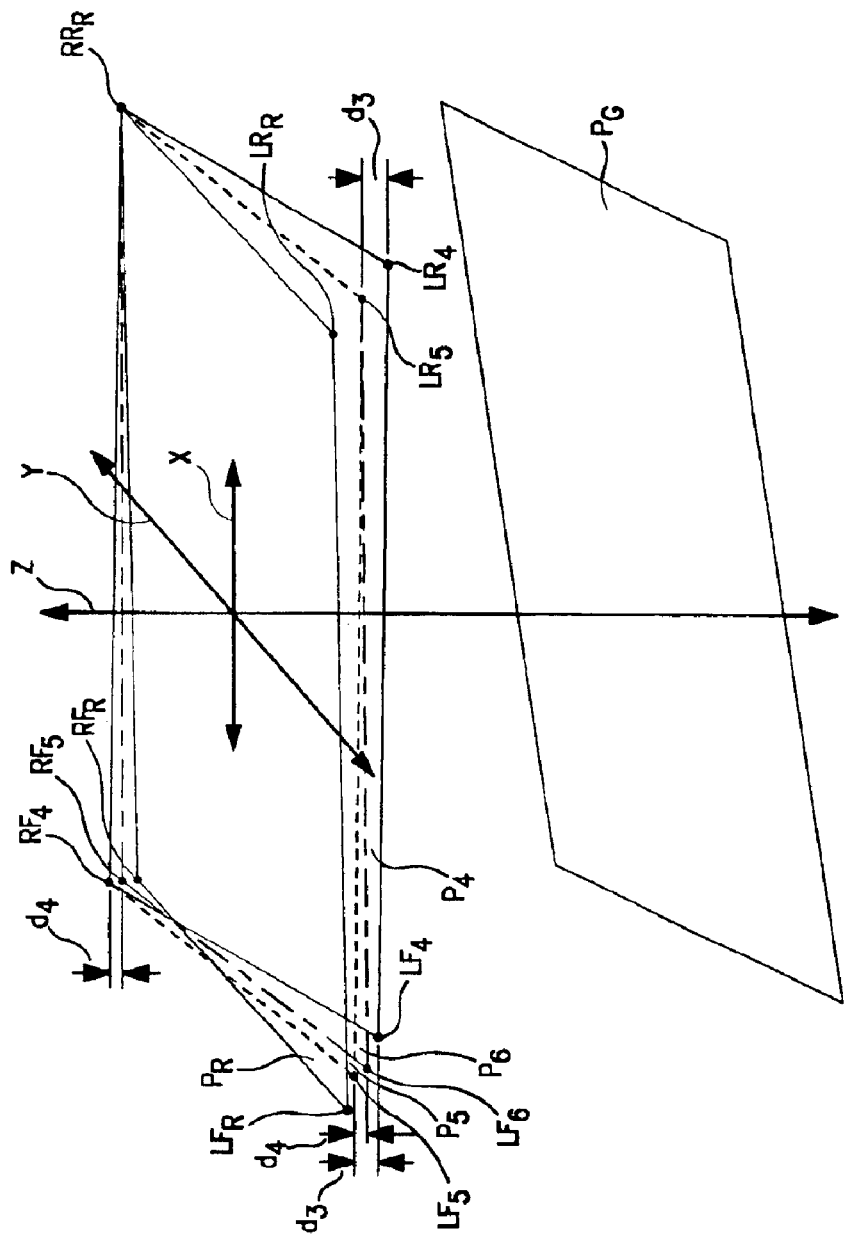
FIG. 8 is a three-dimensional diagram of various planes similar to FIG. 7.

Referring now to FIG. 8, the plane $P_4$ represents the orientation of vehicle 10 after multiple iterations of upward adjustments as described above. The plane $P_4$ is bounded by the points $LF_4$, $RF_4$, $RR_R$, and $LR_4$. The point $RF_4$ is above the right front point $RF_R$ of the referenced level plane $P_R$. The plane $P_4$ represents an orientation wherein the front end of vehicle 10 is one adjustment away from passing through the reference level plane $P_R$. Assume that the next adjustment in the sequence illustrated in FIG. 8 is an upward adjustment of the left side of vehicle 10. The point $LF_4$ is moved to the point $LF_5$ by microprocessor 110. Actuation of left front leg 20 for the predetermined period of time results in an upward adjustment of distance $d_3$. Next, left rear leg 50 is actuated by microprocessor 110 for the predetermined period of time such that the point $LR_4$ is moved to the point $LR_5$ (a distance of $d_3$). At this orientation, vehicle 10 lies in the plane $P_5$, and the front end of vehicle 10 has passed through the reference level plane $P_R$. Because the automatic leveling sequence alternates between adjustments of the legs on one side and one end of vehicle 10, the next adjustment is made to the front end of vehicle 10.

Microprocessor 110 interprets the orientation signal from level sensor 90 and determines upon comparison of that signal to the data representing the reference level plane $P_R$ stored in memory 120, that the front end of vehicle 10 has passed through the reference level plane $P_R$. Accordingly, microprocessor 110 actuates left front leg 20 of the vehicle 10 in a downward direction for a second predetermined period of time which is less than the first predetermined period of time. In one embodiment of the invention, the second predetermined period of time is approximately one-half the first predetermined period of time (or ½ second). As is shown in the figure, the left front point $LF_5$ is moved downwardly to the left front point $LF_6$ during this adjustment (a downward adjustment of the distance $d_4$). The distance $d_4$ is less than the distance $d_3$ because the time period for actuation of leg 20 in the downward direction is less than the time period for actuation of leg 20 in the upward direction.

Right front leg 30 is likewise adjusted in the downward direction by microprocessor 110 such that right front corner of vehicle 10 moves from the point $RF_4$ to the point $RF_5$ (a distance $d_4$). The plane $P_6$ represents the orientation of vehicle 10 after the adjustments described above have been accomplished. As should be apparent, the front end of the vehicle remains above the reference level plane $P_R$, but closer to the plane $P_R$ than its previous orientation, and the left side of vehicle 10 remains below the plane $P_R$, but closer than the orientation preceding these adjustments. Microprocessor 110 carries out the automatic leveling sequence in this manner until vehicle 10 orientation as represented by the orientation signal from level sensor 90 is approximately the same as the reference level plane $P_R$. Each time the orientation signal indicates that an end or side of vehicle 10 has been adjusted upwardly or downwardly through the reference level plane $P_R$, the period of time for actuation (either upward or downward) of that end or side of the vehicle 10 is reduced. In this manner, as microprocessor 110 alternates between sequential adjustments of front 20, 30 legs and sequential adjustments of left legs 20, 50, vehicle 10 continues to approach the reference level plane $P_R$. The automatic leveling sequence is discontinued by microprocessor 110 when the period of time of actuation of the legs has been reduced to a sufficiently small increment, or the difference between the reference plane $P_R$ stored in memory 120 and the actual vehicle plane as measured by sensor 90 is within a specified tolerance, or after a time-out period of, for example, three minutes, expires.

When level is reached, microprocessor 110 generates a signal on data bus 106 which sounds alarm 138 in a manner indicating a successful level. Additionally, a signal of data bus 106 is passed through latch 114 and disables driver 116 driving front panel indicator 66a corresponding to level switch 66.

When the operator is ready to relocate vehicle 10, the operator may actuate the up switch 67 which generates a signal at latch 104 and via data bus 106 to microprocessor 110. This signal is interacted by microprocessor 110 as a command to retract all legs 20, 30, 40, 50 until they reach their respective stowed positions. Accordingly, microprocessor 110 generates a signal through data bus 106 to latch 114 and driver 116 to cause front panel indicator 67a to be illuminated. Additionally microprocessor 110 actuates relays 130, 131, 132, 133 corresponding to legs 20, 30, 40, 50 and relay 134 corresponding to the up direction solenoid. As a result, all legs 20, 30, 40, 50 retract as pistons 23 are drawn within upper cylinders 22 of each leg. Eventually, cams 24 of each leg engage lower end 29 of upper cylinder 22 and lower leg extension 25 and foot 26 pivot into the stowed position. Each time a leg pivots into the stowed position, leg sensor 80 generates a signal which passes through latch 146 to microprocessor 110 indicating that leg's stowed status.

An additional feature of the automatic leveling system according to the present invention is the ability of the system to recalibrate or reset the reference level plane $P_R$. While level sensor 90 should be installed on vehicle 10 such that the reference level plane $P_R$ is as close to true level as possible, after time or when the vehicle is loaded with equipment or fueled up, it is possible that the actual interior level orientation is different from the initial reference level setting. Accordingly, it is desirable to be able to recalibrate the reference level plane $P_R$ in the field. The procedure for recalibrating the reference level plane $P_R$ includes positioning vehicle 10 on a flat surface or using the manual controls to level the system such that the vehicle feels or measures level from the inside of the vehicle. Power switch 65 is then moved into the off position. The operator then actuates level switch 66 and power switch 65. If, upon power up, microprocessor 110 detects a signal from level switch 66, microprocessor 110 will interpret that signal as a command to enter the recalibrate reference level mode. When in this mode, microprocessor 110 reads the digital orientation signal from level sensor 90 and outputs that data to memory 120, thereby replacing the previous reference level plane data with the newly calibrated reference level plane data. The microprocessor 110 may also command sensor microprocessor 92b to adjust sensor amplifier 92a circuit for optimum range and resolution of sensor 90.

While this invention has been described as having exemplary embodiments, this application is intended to cover any variations, uses, or adaptations using its general principles. Further, this application is intended to cover such departures from the present invention as disclosed as come the known or customary practice within the art to which it pertains. The spirit and scope of the invention ought to be limited only by the terms of the appended claims.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. Apparatus for leveling a vehicle, comprising: a right front leg, a left front leg, a right rear leg, and a left rear leg mounted to the vehicle, each leg being independently adjustable between a stowed position and an extended position wherein the leg engages the ground; a sensor mounted to the vehicle to sense the pitch and roll of the vehicle relative to a reference level plane, the sensor producing an orientation signal representing the vehicle pitch and roll; a controller coupled to the legs and the sensor, the controller responding to an operator command to level the vehicle relative to the reference level plane by actuating the legs such that they move from their stowed position to their extended position, interpreting the orientation signal to determine an end and a side of the vehicle which is above the reference level plane, then alternating between adjusting the end and the side downwardly by retracting the legs at the end and retracting the legs at the side, each leg being retracted for a first predetermined period of time during each downward adjustment.

2. The apparatus of claim 1, wherein the sensor provides the orientation signal to the controller indicating a change in the vehicle orientation after each leg engages the ground and extends sufficiently to affect the vehicle orientation.

3. The apparatus of claim 1, wherein the controller interprets the orientation signal after each adjustment to determine whether either the end or the side has passed through the reference level plane.

4. The apparatus of claim 3, wherein upon determining that the one end or the side has passed through the reference level plane, the controller alternates between adjusting the one end or side upwardly by extending at least one leg at the one end or side for a second predetermined period of time which is less than the first predetermined period of time, and continuing to adjust the other end or side downwardly by retracting at least one leg at the other end or side for the first predetermined period of time.

5. The apparatus of claim 4, wherein the controller changes the direction of adjustment of the end and the side each time the end and the side pass through the reference level plane as indicated by the orientation signal and reduces the period of time for extending or retracting the legs at the end and the side with each passing of the reference level plane.

6. The apparatus of claim 1, further comprising switches for individually actuating the legs.

7. The apparatus of claim 1, further comprising four leg sensors mounted adjacent each of the respective legs, each leg sensor being connected to the controller to provide a signal indicating that the respective leg is in its stowed position.

8. An apparatus for automatically leveling a vehicle, comprising:
   a plurality of legs each of which is mounted to the vehicle;
   wherein each of the legs is movable between a retracted stowed position and an extended use position; and
   wherein each of the legs is movable to the retracted stowed position to allow the vehicle to travel and each of the legs is movable to the extended use position to engage a ground surface prior to leveling the vehicle;
   a sensor mounted to the vehicle to sense pitch and roll of the vehicle relative to a reference level plane;
   wherein the sensor produces an orientation signal representing the vehicle pitch and roll; and
   a controller coupled to each of the legs and the sensor;
   wherein the controller monitors the orientation signal received from the sensor and in response to that signal the controller causes at least one of the legs to retract to move the vehicle downwardly relative to the ground surface, for orienting the vehicle with the reference level plane within a tolerance.

9. The apparatus of claim 8 wherein the sensor provides the orientation signal to the controller indicating a change in the vehicle orientation after each leg engages the ground and extends sufficiently to affect the vehicle orientation.

10. The apparatus of claim 8, wherein the controller interprets the orientation signal after each adjustment to determine whether a portion of the vehicle has passed through the reference level plane.

11. The apparatus of claim 10, wherein upon determining that a portion of the vehicle has passed through the reference level plane, the controller alternates between adjusting an end upwardly by extending at least one leg for a predetermined period of time, and continuing to adjust another end downwardly by retracting at least one of the legs for another predetermined period of time.

12. The apparatus of claim 11 wherein the controller changes the direction of adjustment of each end every time the vehicle passes through the reference level plane as indicated by the orientation signal, and reduces the period of time for extending or retracting the legs with each passing of the vehicle through the reference level plane.

13. The apparatus of claim 8 further comprising switches for individually actuating the legs.

14. The apparatus of claim 8 further comprising a plurality of leg sensors, one mounted adjacent to each of the legs, each leg sensor being connected to the controller to provide a signal indicating that the adjacent leg is in its stowed position.

15. A method for automatically leveling a vehicle which provides a plurality of legs which are each attached to the vehicle such that each of the legs is movable between retracted and extended positions, a sensor mounted to the vehicle to sense pitch and roll of the vehicle and which provides an orientation signal representing the pitch and roll, and a controller coupled to the legs and the sensor, the method comprises:

extending each leg until it engages a ground surface;

comparing the orientation signal produced by the sensor to the reference level plane after all legs have engaged the ground;

determining a high portion of the vehicle, relative to the reference level plane;

retracting at least one of the legs corresponding to that high portion for a determined actuation period; and determining whether the high portion of the vehicle has moved through the reference level plane after the retraction of the at least one of the legs.

16. The method of claim 15, further comprising the steps of determining a low portion of the vehicle relative to the reference level plane.

17. The method of claim 16, further comprising the steps of extending at least on of the legs corresponding to a low portion of the vehicle for a determined actuation period.

18. The method of claim 17, further comprising the steps of determining whether the low portion of the vehicle has moved through the reference level plane after the extension of the at least one of the legs.

19. The method of claim 18, further comprising the steps of changing direction of movement of the vehicle every time it passes through the reference level plane as indicated by the orientation signal, and reducing the period of time for extending or retracting the legs of the vehicle with each passing of the vehicle through the reference level plane.

* * * * *